United States Patent
Chen et al.

(10) Patent No.: US 9,182,261 B1
(45) Date of Patent: Nov. 10, 2015

(54) THERMAL MASS FLOW METER

(71) Applicant: FINETEK Co., Ltd., New Taipei (TW)

(72) Inventors: Jia-Yi Chen, New Taipei (TW);
Ching-Cheng Kuo, New Taipei (TW);
Chao-Kai Cheng, New Taipei (TW);
Yi-Liang Hou, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 0 days.

(21) Appl. No.: 14/582,952

(22) Filed: Dec. 24, 2014

(51) Int. Cl.
*G01F 1/68* (2006.01)
*G01F 1/72* (2006.01)
*G01F 1/684* (2006.01)

(52) U.S. Cl.
CPC ...................... *G01F 1/684* (2013.01)

(58) Field of Classification Search
CPC ...................... G01F 1/68; G01F 1/72
USPC ...................................... 73/204.23
See application file for complete search history.

(56) References Cited

U.S. PATENT DOCUMENTS

| | | | |
|---|---|---|---|
| 4,920,263 A * | 4/1990 | Fimian et al. | 250/255 |
| 5,944,048 A * | 8/1999 | Bump et al. | 137/487.5 |
| 6,487,904 B1 * | 12/2002 | Myhre | 73/204.12 |
| 6,536,273 B2 * | 3/2003 | Schrittenlacher | 73/204.11 |
| 2005/0034535 A1 * | 2/2005 | Sprague | 73/861.22 |
| 2009/0277278 A1 * | 11/2009 | Koudal et al. | 73/861.08 |
| 2010/0139390 A1 * | 6/2010 | Gimson et al. | 73/204.23 |
| 2011/0005311 A1 * | 1/2011 | Boguhn et al. | 73/204.11 |
| 2012/0216629 A1 * | 8/2012 | Huang et al. | 73/861.95 |
| 2013/0041234 A1 * | 2/2013 | Grinstein et al. | 600/301 |
| 2013/0060492 A1 * | 3/2013 | Stabile et al. | 702/45 |
| 2013/0152698 A1 * | 6/2013 | Kurz et al. | 73/861 |
| 2015/0075277 A1 * | 3/2015 | Badarlis et al. | 73/204.23 |

* cited by examiner

*Primary Examiner* — Max Noori
*Assistant Examiner* — Jamel Williams
(74) *Attorney, Agent, or Firm* — Chun-Ming Shih; HDLS IPR Services

(57) ABSTRACT

A thermal mass flow meter includes a housing, a control module, a plurality of probes, a flow calculation circuit, and a heating module. The control module is installed in a containing space. The probes are connected to one terminal of the housing. The flow calculation circuit is connected to the control module, and has a plurality of circuit boards installed in the probes and a plurality of temperature sensing units connected to the circuit boards. The heating module is connected on one of the circuit boards, and connected to the control module. The control module controls the heating module to heat a working fluid in a pipeline; the flow calculation circuit senses the temperature inside the pipeline to acquire temperature change values, and transmits the temperature change values to the control module; and the control module measures the fluid velocity of the working fluid.

6 Claims, 4 Drawing Sheets

THERMAL MASS FLOW METER

BACKGROUND OF THE INVENTION

1. Technical Field

The present disclosure generally relates to a flow meter, and more particularly to a thermal mass flow meter for measuring fluid velocity.

2. Description of Related Art

A thermal mass flow meter is usually used to measure the fluid velocity in the pipeline, thus judging whether the fluid flows or not. In general, multiple probes of the thermal mass flow meter are arranged in the pipeline when the thermal mass flow meter is assembled to the pipeline. In particular, two resistors and two thermal resistors are electrically connected to the Wheatstone bridge circuit. Also, the two thermal resistors are installed in one of the probes and the two resistors are installed outside the thermal mass flow meter, and a heating module is installed in another of the probes.

The thermal mass flow meter is used to measure the fluid velocity in the pipeline according to the relationship of the fluid velocity is inversely proportional to the temperature difference. Also, the thermal mass flow meter provides a control unit to control heating units installed in the probes to heat the fluid in the pipeline. When the Wheatstone bridge circuit is balanced because of the unchanged resistance values, there is no current through the control unit. That is, it indicates that the fluid velocity of the fluid is normal. However, the corresponding resistance values of the two thermal resistors would be changed to cause the current variation when the increased temperature by heating the heating unit is stagnated around the probes. After the current variation is transmitted to the control unit, the fluid velocity of the fluid can be measured according to the sensed temperature values because the fluid velocity is inversely proportional to the temperature.

Although the thermal mass flow meter can be used to measure the fluid velocity of the fluid in the pipeline, the measured results from the two resistors installed outside the thermal mass flow meter would be not completely correct due to the influence of the external ambient temperature.

SUMMARY OF THE INVENTION

An object of the present disclosure is to provide a thermal mass flow meter to solve the above-mentioned problems. Accordingly, a plurality of thermal resistors are used to be temperature sensing units instead of the conventional resistors in a Wheatstone bridge circuit of the thermal mass flow meter so that the fluid velocity of the working fluid in the pipeline can be accurately measured in high-temperature and high-flow-velocity conditions.

In order to achieve the above-mentioned object, the thermal mass flow meter is applied to a pipeline and a working fluid flows through the pipeline. The thermal mass flow meter includes a housing, a control module, a plurality of probes, a flow calculation circuit, and a heating module. The housing has a containing space therein, and the control module is installed in the containing space. The probes are connected to one terminal of the housing, and each probe has an installation space communicated with the containing space. The flow calculation circuit is electrically connected to the control module, and has a plurality of temperature sensing units installed in the installation spaces of the probes. The heating module is electrically connected on one of the circuit boards, and electrically connected to the control module. The control module controls the heating module to heat the working fluid in the pipeline; the flow calculation circuit senses the temperature inside the pipeline to acquire temperature change values, and transmits the temperature change values to the control module; and the control module measures the fluid velocity of the working fluid.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
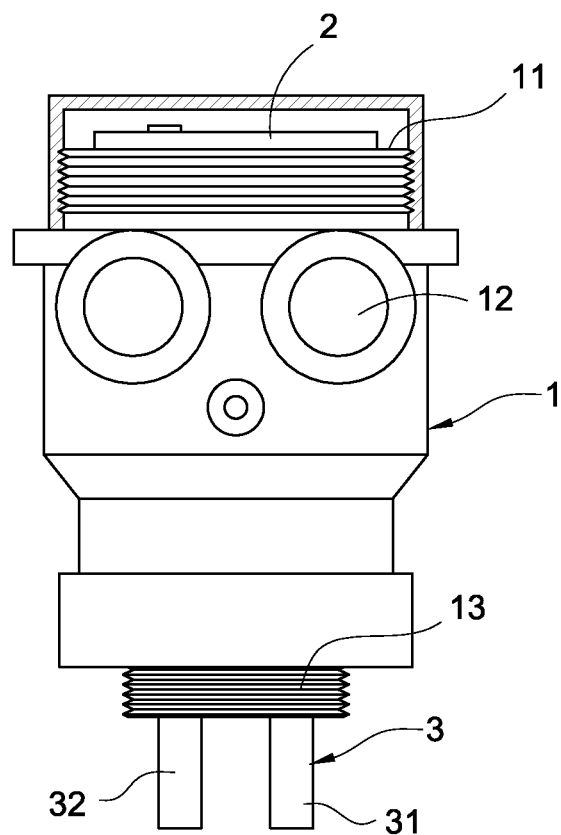
FIG. 1 is a schematic view of a thermal mass flow meter according to the present disclosure.

Reference will now be made to the drawing figures to describe the present disclosure in detail.

Figure 2:
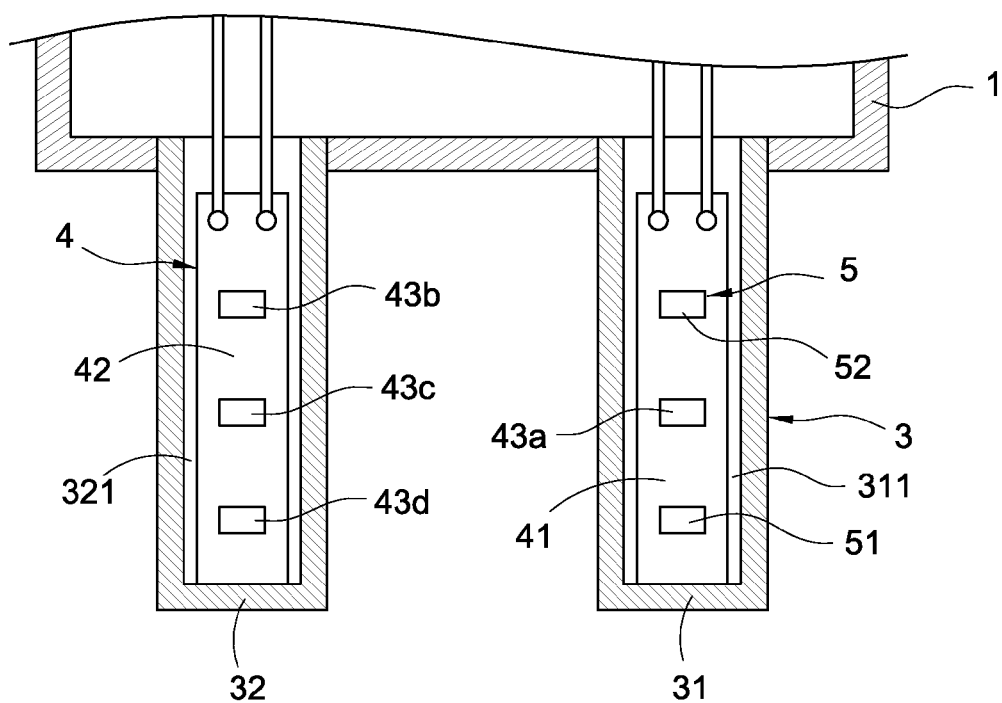
FIG. 2 is a schematic sectional view of the thermal mass flow meter in FIG. 1.

Reference is made to FIG. 1 and FIG. 2 which are a schematic view of a thermal mass flow meter according to the present disclosure and a schematic sectional view of the thermal mass flow meter in FIG. 1, respectively. The thermal mass flow meter includes a housing 1, a control module 2, a plurality of probes 3, a flow calculation circuit 4, and a heating module 5.

The housing 1 has a containing space 11 therein and has at least two through holes 12. The two through holes 12 are communicated with the containing space 11 for transmission wires (not shown) of connecting external signals. An assembling portion 13 with a thread surface is configured under the housing 1 so that the housing 1 can be assembled to a pipeline 6 (shown in FIG. 3).

The control module 2 is installed in the containing space 11 of the housing 1 for receiving sensing signals transmitted from the flow calculation circuit 4 and controlling the heating module 5 for heating operations. The detail description of the control module 2 is omitted here for conciseness since the circuit structure of the control module 2 in the present disclosure is conventional.

The probes 3 are connected under the assembling portion 13. In this embodiment, the probes 3 are composed of a first probe 31 and a second probe 32. The first probe 31 has an installation space 311 therein and the second probe 32 has an installation space 321 therein, and the installation spaces 311, 321 are communicated with the containing space 11 of the housing 1. In this embodiment, the probes 3 are stainless steel material.

The flow calculation circuit 4 is electrically connected to the control module 2, and the flow calculation circuit 4 includes a first circuit board 41, a second circuit board 42, and four temperature sensing units 43a-43d, namely, a first temperature sensing unit 43a, a second temperature sensing unit 43b, a third temperature sensing unit 43c, and a fourth temperature sensing unit 43d. In particular, the first temperature sensing unit 43a is electrically connected on the first circuit board 41; the second temperature sensing unit 43b, the third temperature sensing unit 43c, and the fourth temperature sensing unit 43d are electrically connected on the second circuit board 42. Especially, the four temperature sensing units 43a-43d are electrically connected to form a Wheatstone bridge circuit by connecting the first circuit board 41 to the second circuit board 42 via conductive wires (not shown). Also, the Wheatstone bridge circuit is electrically connected the control module 2. In addition, the first circuit board 41 is installed in the installation space 311 of the first probe 31 and the second circuit board 42 is installed in the installation space 321 of the second probe 32. In this embodiment, the four temperature sensing units 43a-43d are thermal resistors.

The heating module 5 is composed of a first heating unit 51 and a second heating unit 52. The first heating unit 51 and the second heating unit 52 are connected on the first circuit board 41, and separately arranged at both sides of the first temperature sensing unit 43a. The first heating unit 51 and the second heating unit 52 are electrically connected to the control module 2 via the first circuit board 41, and the two heating units 51, 52 are controlled by the control module 2 to heat a fluid 7 in the pipeline 6.

Figure 3:
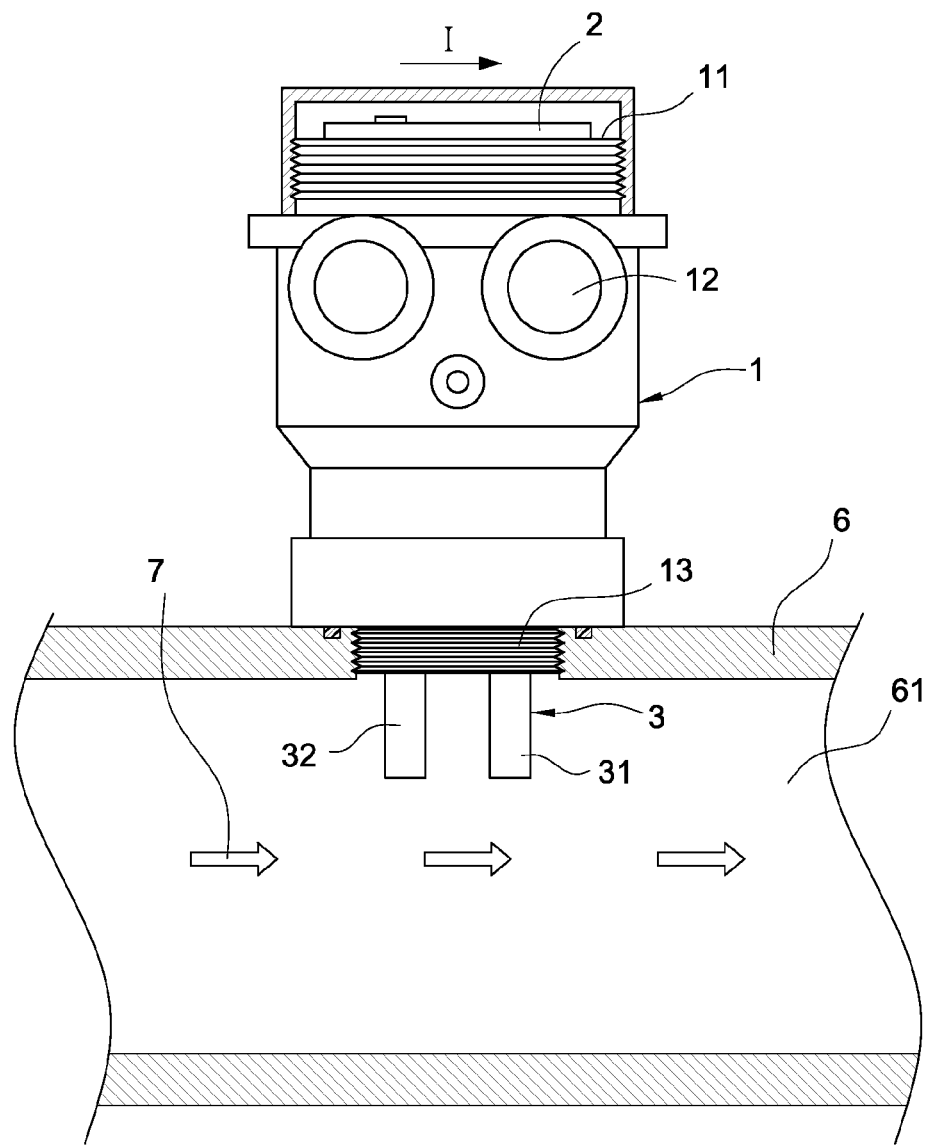
FIG. 3 is a schematic view of operating the thermal mass flow meter according to the present disclosure.
Figure 4:
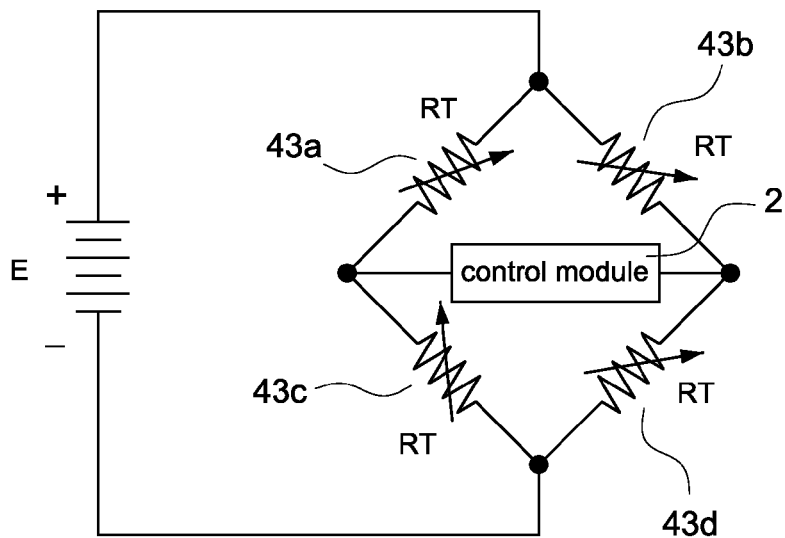
FIG. 4 is a schematic view of a Wheatstone bridge circuit composed of a plurality of temperature sensing units according to the present disclosure.

Reference is made to FIG. 3 and FIG. 4 which are a schematic view of operating the thermal mass flow meter and a schematic view of a Wheatstone bridge circuit composed of a plurality of temperature sensing units according to the present disclosure, respectively. The first, second, third, and fourth temperature sensing units 43a-43d are electrically connected to form a Wheatstone bridge circuit, and the Wheatstone bridge circuit is electrically connected to the control module 2.

The first probe 31 and the second probe 32 are arranged in a channel 61 of the pipeline 6 when the thermal mass flow meter is assembled to the pipeline 6 through the assembling portion 13 of the housing 1. The first heating unit 51 and the second heating unit 52 installed in the first probe 31 are controlled to sequentially heat by the control module 2 when the fluid 7 flows through the channel 61. When the Wheatstone bridge circuit is balanced because of the unchanged resistance values, namely, 43b/43a=43d/43c, there is no current through the control module 2. Accordingly, it indicates that the fluid velocity of the fluid 7 flowing through the channel 61 is normal.

The corresponding resistance values of the four temperature sensing units 43a-43d would be changed when the increased temperature by heating the first heating unit 51 and the second heating unit 52 is stagnated around the first probe 31 and the second probe 32. Because the fluid velocity is inversely proportional to the temperature, the fluid velocity of the fluid 7 can be measured according to the resistance values of the four temperature sensing units 43a-43d sensed by the control module 2.

Especially, the temperature values inside the pipeline 6 can be accurately sensed to accurately measured the fluid velocity of the fluid 7 because the four temperature sensing units 43a-43d are installed inside the probes 3. Accordingly, the embodiment is suitable for measuring fluid velocity in high-temperature and high-flow-velocity conditions.

Figure 5:
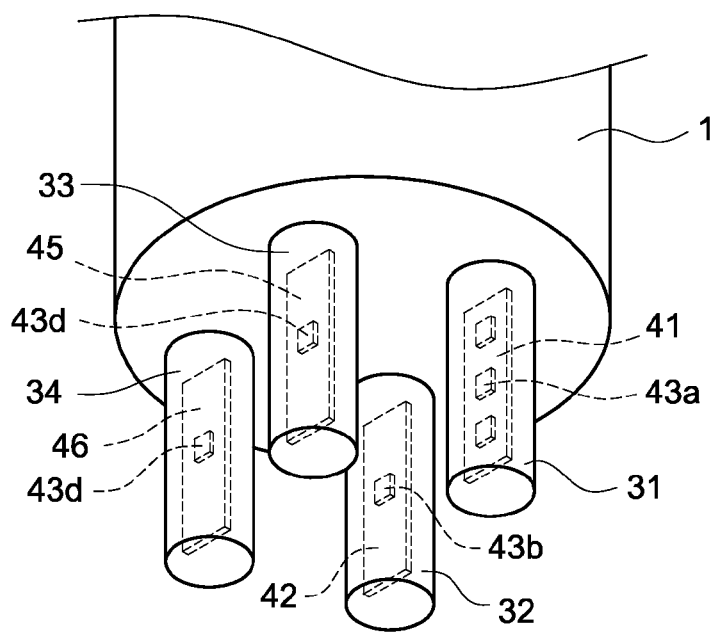
FIG. 5 is a schematic view of a thermal mass flow meter according to another embodiment the present disclosure.

Reference is made to FIG. 5 which is a schematic view of a thermal mass flow meter according to another embodiment the present disclosure. The major difference between the embodiment in FIG. 1 and the embodiment in FIG. 5 is that the latter provides four probes 3, namely, a first probe 31, a second probe 32, a third probe 33, and a fourth probe 34. The first temperature sensing unit 34a, the second temperature sensing unit 34b, the third temperature sensing unit 34c, and the fourth temperature sensing unit 34d are electrically connected on a first circuit board 41, a second circuit board 42, a third circuit board 45, and a fourth circuit board 46, respectively. Also, a heating module 5 is electrically connected on the first circuit boar 41. The first circuit board 41, the second circuit board 42, the third circuit board 45, and the fourth circuit board 46 are electrically connected to form a Wheatstone bridge circuit; and the Wheatstone bridge circuit is electrically connected the control module 2. In particular, the e first circuit board 41, the second circuit board 42, the third circuit board 45, and the fourth circuit board 46 are installed in the first probe 31, the second probe 32, the third probe 33, and the fourth probe 34, respectively.

The first probe 31, the second probe 32, the third probe 33, and the fourth probe 34 are arranged in a channel 61 of the pipeline 6 when the thermal mass flow meter is assembled to the pipeline 6 through the assembling portion 13 of the housing 1 (shown in FIG. 3). The first heating unit 51 and the second heating unit 52 installed in the first probe 31 are controlled to sequentially heat by the control module 2 when the fluid 7 flows through the channel 61. When the Wheatstone bridge circuit is balanced because of the unchanged resistance values, namely, 43b/43a=43d/43c, there is no current through the control module 2. Accordingly, it indicates that the fluid velocity of the fluid 7 flowing through the channel 61 is normal.

The corresponding resistance values of the four temperature sensing units 43a-43d would be changed when the increased temperature by heating the first heating unit 51 and the second heating unit 52 is stagnated around the first probe 31, the second probe 32, the third probe 33, and the fourth probe 34. Because the fluid velocity is inversely proportional to the temperature, the fluid velocity of the fluid 7 can be measured according to the resistance values of the four temperature sensing units 43a-43d sensed by the control module 2.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A thermal mass flow meter applied to a pipeline, and a working fluid flowing through the pipeline, the thermal mass flow meter comprising:
   a housing having a containing space;
   a control module installed in the containing space;
   a plurality of probes connected to one terminal of the housing, and each probe having an installation space communicated with the containing space;
   a flow calculation circuit electrically connected to the control module, and having a plurality of temperature sensing units installed in the installation spaces of the probes;

a heating module electrically connected on one of a plurality of circuit boards, and electrically connected to the control module;

wherein the control module is configured to control the heating module to heat the working fluid in the pipeline; the flow calculation circuit is configured to sense the temperature inside the pipeline to acquire temperature change values, and transmit the temperature change values to the control module; and the control module is configured to measure the fluid velocity of the working fluid;

wherein the flow calculation circuit further comprises a plurality of circuit boards having a first circuit board and a second circuit board; the temperature sensing units comprise a first temperature sensing unit, a second temperature sensing unit, a third temperature sensing unit, and a fourth temperature sensing unit; the first temperature sensing unit is electrically connected on the first circuit board, and the second temperature sensing unit, the third temperature sensing unit, the fourth temperature sensing unit are electrically connected on the second circuit board; the first circuit board and the second circuit board are electrically connected to form a Wheatstone bridge circuit, and the Wheatstone bridge circuit is electrically connected to the control module.

2. The thermal mass flow meter in claim 1, wherein the probes comprise a first probe and a second probe; the first circuit board is installed in the installation space of the first probe and the second circuit board is installed in the installation space of the second probe.

3. The thermal mass flow meter in claim 2, wherein the first temperature sensing unit, the second temperature sensing unit, the third temperature sensing unit, and the fourth temperature sensing unit are thermal resistors.

4. The thermal mass flow meter in claim 3, wherein the heating module comprises a first heating unit and a second heating unit; the first heating unit and the second heating unit are electrically connected on the first circuit board and separately arranged at both sides of the first temperature sensing unit.

5. A thermal mass flow meter applied to a pipeline, and a working fluid flowing through the pipeline, the thermal mass flow meter comprising:

a housing having a containing space;
a control module installed in the containing space;
a plurality of probes connected to one terminal of the housing, and each probe having an installation space communicated with the containing space;
a flow calculation circuit electrically connected to the control module, and having a plurality of temperature sensing units installed in the installation spaces of the probes;
a heating module electrically connected on one of a plurality of circuit boards, and electrically connected to the control module;

wherein the control module is configured to control the heating module to heat the working fluid in the pipeline; the flow calculation circuit is configured to sense the temperature inside the pipeline to acquire temperature change values, and transmit the temperature change values to the control module; and the control module is configured to measure the fluid velocity of the working fluid;

wherein the probes comprise a first probe, a second probe, a third probe, and a fourth probe;

wherein the flow calculation circuit further comprises a plurality of circuit boards having a first circuit board, a second circuit board, a third circuit board, and a fourth circuit board; the temperature sensing units comprise a first temperature sensing unit, a second temperature sensing unit, a third temperature sensing unit, and a fourth temperature sensing unit; the first temperature sensing unit is electrically connected on the first circuit board, the second temperature sensing unit is electrically connected on the second circuit board, the third temperature sensing unit is electrically connected on the third circuit board, and the fourth temperature sensing unit is electrically connected on the fourth circuit board; the first circuit board, the second circuit board, the third circuit board, and the fourth circuit board are electrically connected to form a Wheatstone bridge circuit, and the Wheatstone bridge circuit is electrically connected to the control module; the first circuit board is installed in the first probe, the second circuit board is installed in the second probe, the third circuit board is installed in the third probe, and the fourth circuit board is installed in the fourth probe.

6. The thermal mass flow meter in claim 5, wherein the heating module comprises a first heating unit and a second heating unit; the first heating unit and the second heating unit are electrically connected on the first circuit board and separately arranged at both sides of the first temperature sensing unit.

\* \* \* \* \*